United States Patent
Fesquet et al.

(10) Patent No.: US 7,446,278 B2
(45) Date of Patent: Nov. 4, 2008

(54) METHOD FOR DETECTING SINGLE POSTAL COVERS AND POSTAL COVERS STUCK TOGETHER IN A MAIL SORTING MACHINE

(75) Inventors: Etienne Fesquet, Valence (FR); Hicham El Bernoussi, Paris (FR); Cyrille Prudhomme, Champigny sur Marne (FR)

(73) Assignee: Solystic, Gentilly Cedex (FR)

( * ) Notice: Subject to any disclaimer, the term of this patent is extended or adjusted under 35 U.S.C. 154(b) by 619 days.

(21) Appl. No.: 10/473,430

(22) PCT Filed: Jun. 12, 2003

(86) PCT No.: PCT/FR03/01766

§ 371 (c)(1),
(2), (4) Date: Sep. 30, 2003

(87) PCT Pub. No.: WO2004/002637

PCT Pub. Date: Jan. 8, 2004

(65) Prior Publication Data

US 2005/0105766 A1 May 19, 2005

(30) Foreign Application Priority Data

Jun. 26, 2002 (FR) .................................. 02 07951

(51) Int. Cl.
*B07C 5/00* (2006.01)

(52) U.S. Cl. ...................... 209/584; 209/583; 209/900; 382/101; 382/190; 382/224

(58) Field of Classification Search ................. 209/583, 209/584, 900; 382/101, 190, 224, 102, 199
See application file for complete search history.

(56) References Cited

U.S. PATENT DOCUMENTS

| 4,733,226 A | * | 3/1988 | Kasuya et al. ............... 340/674 |
| 6,175,644 B1 | * | 1/2001 | Scola et al. .................. 382/141 |
| 6,761,352 B2 | * | 7/2004 | Scicluna et al. ............. 271/153 |
| 6,817,610 B2 | * | 11/2004 | Rompe ................... 271/265.04 |
| 6,824,058 B2 | * | 11/2004 | Patel et al. ................ 235/462.2 |
| 2003/0038065 A1 | * | 2/2003 | Pippin et al. ................. 209/584 |

FOREIGN PATENT DOCUMENTS

| DE | 196 25 043 C1 | 4/1997 |
| EP | 0 696 484 A2 | 12/1996 |

* cited by examiner

*Primary Examiner*—Patrick Mackey
*Assistant Examiner*—Terrell H Matthews
(74) *Attorney, Agent, or Firm*—Sughrue Mion, PLLC

(57) ABSTRACT

The method of detecting single postal items and multiple overlapping postal items in a postal sorting installation consists in analyzing images (5) representing postal items (6) viewed from in front, and in applying to each image an outline-extracting process (10) in order to recognize items (6) having an outline (10) of substantially constant height as being single items. In this method, the reliability with which single items is detected is improved, and the digital image used for analysis purposes can be the digital image which is also used for optical character recognition processing in the postal sorting installation.

6 Claims, 4 Drawing Sheets

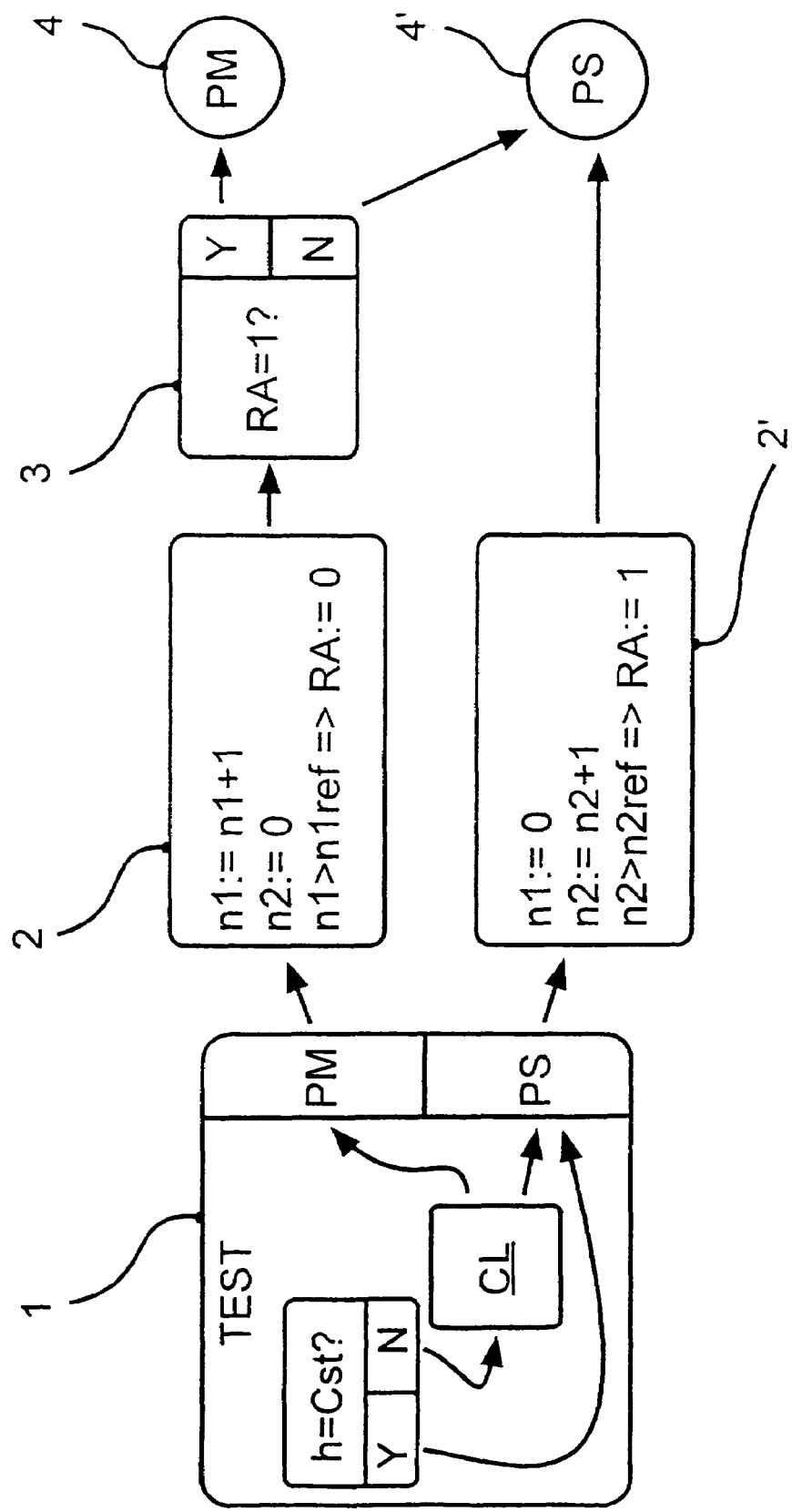
FIG_1

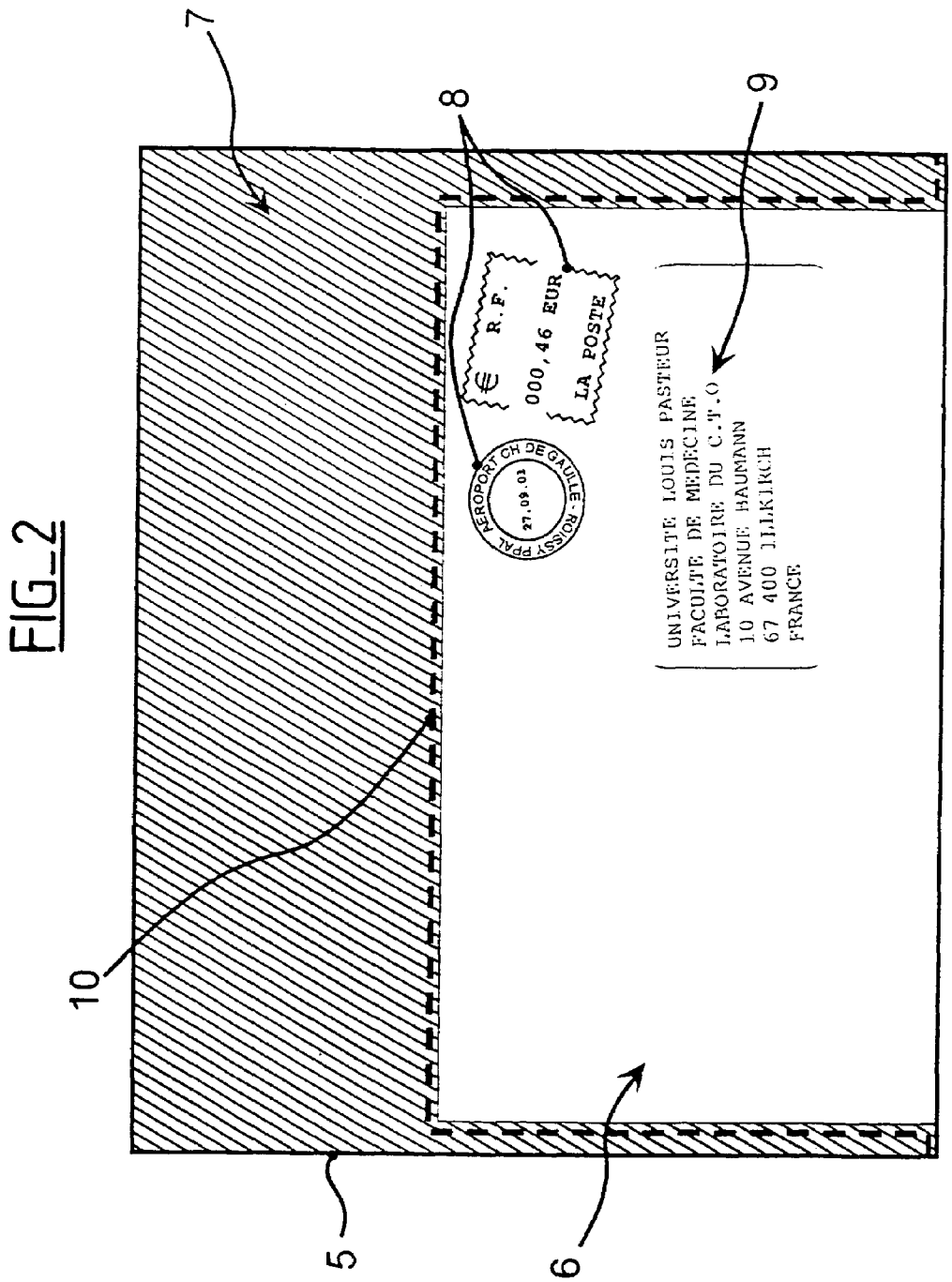

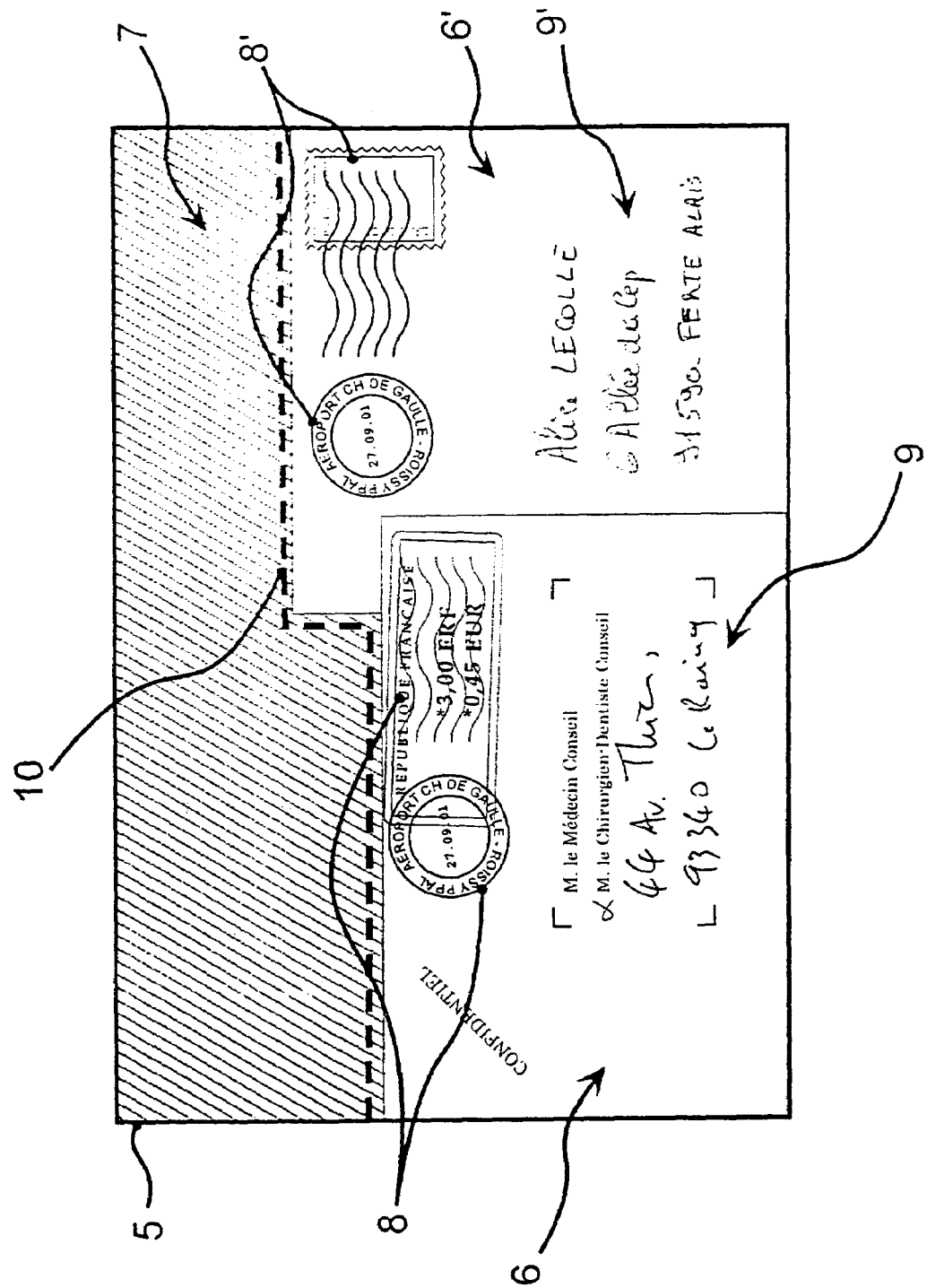

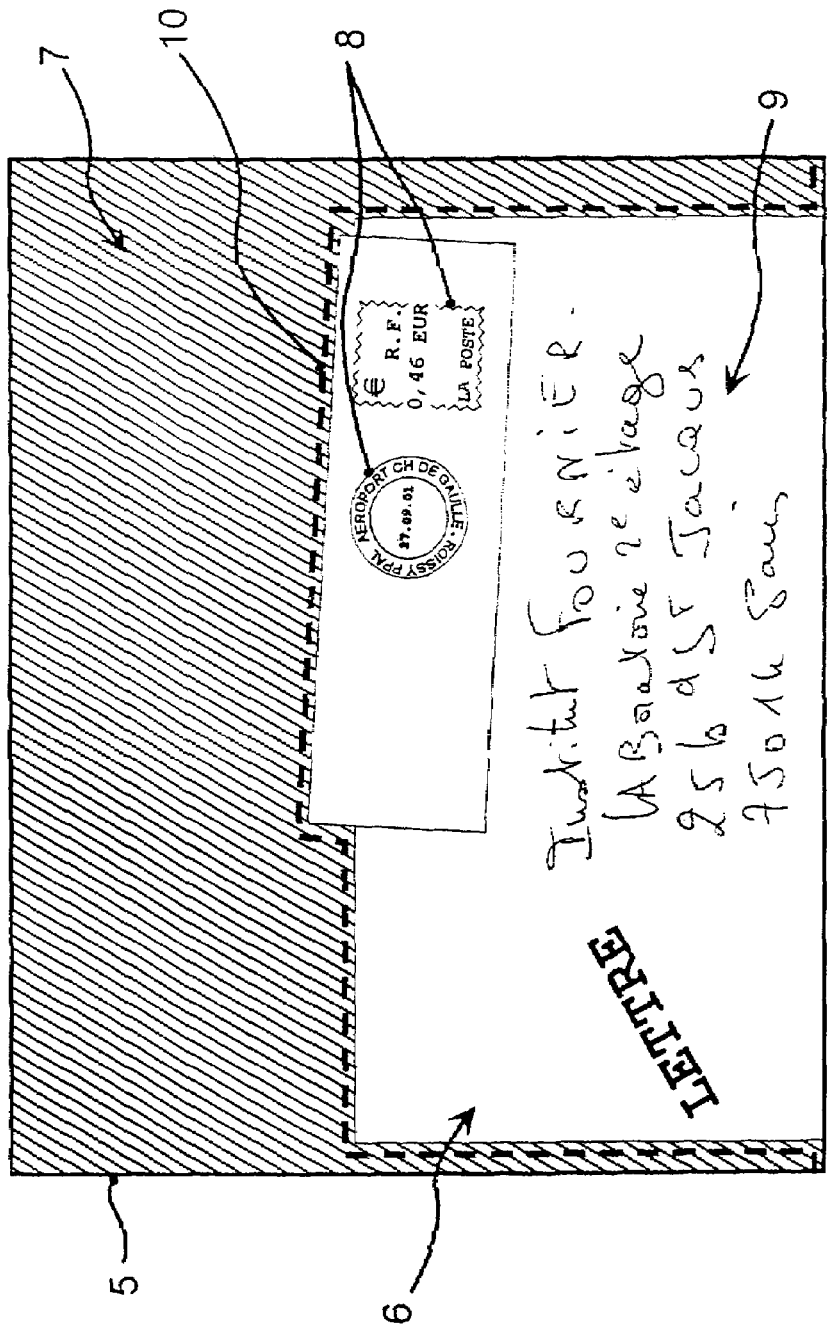
FIG_4

METHOD FOR DETECTING SINGLE POSTAL COVERS AND POSTAL COVERS STUCK TOGETHER IN A MAIL SORTING MACHINE

The invention relates to a method of detecting single postal items and multiple overlapping postal items in a postal sorting installation by analyzing images representing postal items viewed from in front.

The method is more particularly designed for a postal sorting installation in which postal items are fed into the installation in the form of stacks of postal items, and in which each postal item is automatically unstacked for the purpose of being directed to a sorting outlet corresponding to the address that it bears. More particularly, an unstacker disposed at the inlet of the installation disposes the postal items in series one behind another on a conveyor. During this unstacking operation, a plurality of postal items can remain stuck together, thereby forming a wad of multiple overlapping postal items. In the event that such a wad of multiple overlapping postal items is not detected in the sorting installation, all of the postal items in the wad are directed to the sorting outlet corresponding to the address borne by the postal item that masks the other items in the wad of multiple overlapping postal items. That corresponds to a destination error, after which the wrongly directed postal items must be withdrawn so as to be sorted again in a subsequent operation, thereby delaying distribution of the postal items to their addressees. Various devices exist for mechanically separating multiple postal items, but such devices represent considerable extra cost, they tend to damage the postal items, and they are of limited reliability. Thus, it remains necessary to detect whether postal items are single postal items or multiple postal items for the purpose of rejecting the multiple postal items by directing them to a special sorting outlet of the installation.

Various methods exist for detecting multiple overlapping postal items, such as the method described in patent application Ser. No. 98/11897. In that method, a digital image is acquired of the edge of each postal item in order to use image analysis to detect whether it is a single postal item or a wad of multiple overlapping postal items. In the event that a wad of multiple postal items is detected, a management system controls the installation so as to reject the wad by directing it to a special sorting outlet. Unfortunately, analysis of the digital image of the edge of a postal item is unreliable, and leads to numerous unwarranted rejects. In particular, the bellows-like edge of an expandable envelope is seen as being a wad of multiple postal items whereas it is in fact a single postal item. In general, existing methods of detecting single postal items and multiple postal items give rise to a large quantity of unwarranted rejects.

An object of the invention is to provide a detection method making it possible to detect multiple postal items with a low proportion of unwarranted rejects.

To this end, the invention provides a method of detecting single postal items and multiple overlapping postal items in a postal sorting installation by analyzing images representing said postal items viewed from in front, said method being characterized in that it consists in applying to each image an outline-extraction process, and in recognizing the postal items that have an outline of substantially constant height as being single items. In this method, the reliability with which single items are detected is improved. Advantageously, said postal images viewed from in front are also used by optical character recognition processing for automatically identifying the addresses on said postal items. Detection of single postal items and of multiple overlapping postal items may be based on processing the digital image that is acquired at the inlet of the installation for the purpose of automatically reading the address of the addressee. It is thus not necessary to integrate into the sorting installation a digital image acquisition device dedicated to detecting multiple overlapping postal items.

In a preferred implementation, said outline-extraction process consists in directly extracting data representing the height of said outline at various points. The postal items that have a non-constant outline are processed by a classifier so as to discriminate between single postal items and multiple overlapping postal items. The quantity of data to be analyzed is reduced, and the workload on the classifier is minimized, thereby contributing to improving processing time.

In another implementation, rejection of multiple overlapping postal items is deactivated when a predetermined number of consecutive postal items are detected as being multiple overlapping postal items, said rejection being deactivated until no multiple overlapping mail items are detected for another predetermined number of consecutive postal items. Thus, for processing a defective batch of mail in which each postal item is seen as being constituted by multiple overlapping postal items whereas it is in fact a single item, the quantity of unwarranted rejects is reduced further.

The invention is described below in more detail and with reference to the accompanying drawings which show one embodiment by way of non-limiting example, and in which:

FIG. 1 is a flow chart showing the method of the invention;

FIG. 2 is a diagrammatic view of a single postal item seen from the front;

FIG. 3 is a diagrammatic view of overlapping multiple postal items seen from the front; and FIG. 4 is a diagrammatic view of a single postal item seen from the front, and that might be detected as being a wad of multiple postal items.

The invention relates to an operating method for a detector for detecting single postal items and multiple overlapping postal items, which detector is part of a postal sorting installation. The detector comprises a camera for acquiring a digital image of each postal item seen from the front, which camera is connected to a central processing unit that may be part of a computerized management system of the sorting installation. The camera used may advantageously be the camera serving for the optical character recognition (OCR) processing. Thus, the images used for the OCR processing are also used for detecting single postal items and multiple overlapping postal items, thereby significantly reducing the cost of implementing the method of the invention.

In the invention, outline extraction processing is applied to each postal item image so as to distinguish between single postal items and multiple overlapping postal items by analyzing the outline extracted from each image. For example, the extraction processing may consist in applying the Sobel operator or the Prewitt operator to the digital image. As shown diagrammatically in block 1 of FIG. 1, the outline analysis may begin with an evaluation of the height of the outline, as represented by the sub-block h=Cst?. FIG. 2 shows that a digital image 5 of a single postal item 6 including various inscriptions 8 and 9 substantially defines a pale surface standing out from a dark background 7 in the image. The bottom edge of the postal item coincides with the bottom edge of the digital image, so that the outline 10 of the postal item substantially defines a rectangle angularly positioned parallel to the bottom edge of the digital image 5. After the outline extraction processing has been applied, the data representing the outline 10 is analyzed, e.g. by comparing the height of the outline at various points so as to decide that it is a single postal item because said height is substantially constant.

In general, tests on batches of mail have shown that the criterion of constant height is pertinent, i.e. it makes it possible to detect single postal items with a very small confusion rate. Thus, with the method of the invention, a postal item such as the postal item shown in FIG. 2 is rapidly identified as being a single postal item. In the event that the height is not constant, the outline of the postal item may advantageously be subjected to more in-depth analysis by a classifier in order decide whether it is single postal item PS or a wad of multiple overlapping postal items PM. This step is represented by the sub-block CL in FIG. 1, and the criteria implemented in this step are described below.

In a particular implementation of the method of the invention, the data representing the outline 10 of a postal item 6 is merely a one-dimensional signal representing the height of the outline of the postal item at various points. For example, such data may be formed by a vector containing a plurality of values for the height $h(x)$ of the top edge of the postal item at points along the bottom edge of the digital image. For example, detecting postal items having outlines of constant height may consist in applying a filter to the outline so as to exclude therefrom the substantially zero values of $h(x)$ before calculating the maximum M of the absolute value of the derivative of the outline: $M=\text{Max}(^3h'(x)^3)$. For the postal item shown in FIG. 2, the zero values for $h(x)$ correspond to the zones situated to the left of the leading edge and to the right of the trailing edge of the postal item, excluding them makes it possible to eliminate the data corresponding to the leading edge and to the trailing edge of the postal item where the derivative $h'(x)$ has a high value. Thus, outlines for which M is close to zero (which corresponds to a substantially constant height) correspond to single postal items. This discrimination may advantageously be implemented by comparing the value M with a reference value Mref stored in a memory in the management system or in the detector so as to identify those postal items for which M<Mref as being single postal items.

Postal items having non-constant outline heights, such as, for example, the postal item shown in FIG. 3, may be directly considered as being multiple overlapping postal items, but advantageously they are subjected to more in-depth analysis of their outlines in order to decide whether they are single postal items or multiple overlapping postal items. More particularly, the digital image of multiple overlapping postal items shown in FIG. 3 comprises first and second postal items 6 and 6' disposed one behind the other. In this example, the outline 10 comprises a first horizontal portion corresponding to the first postal item 6, followed by a vertical portion and by another horizontal portion corresponding to the second postal item 6'. The vertical portion of the outline corresponds to a high derivative which is discriminatory and which results in the condition M>Mref so that said postal item is not identified as being a single postal item at the sub-block h=cst? of FIG. 1, and is then directed to the sub-block CL.

The processing of the sub-block CL may begin with extracting various primitives from the outline in order to characterize it. Such primitives may be constituted by the standard deviation of the outline, and the length L of the postal item. By way of example, the following may also be mentioned: the second-order derivative that locates the discontinuities and their amplitudes in the outline: other statistical descriptors such as the normalized moments or the median; and transforms such as the Fourier transform. Taking account of the primitives for the purpose of deciding whether the postal item is a single item or multiple overlapping postal items may be implemented by a classifier equipping the detector or management system of the postal sorting installation. For example, the classifier may be implemented in the form of a neural net, of a fuzzy logic circuit, of an expert system, or of a combination of these various techniques.

In order to reduce even further the confusion rate in detecting multiple overlapping postal items, the rejecting of multiple postal items may be temporarily deactivated under certain circumstances. In the invention, such deactivation is decided on independently by the detector on the basis of a count of successive detections, so as to detect batches of mail that are conducive to confusion. FIG. 4 shows an example of a postal item in such a batch of mail, which item is an envelope having a franking label stuck on slantwise. The franking label substantially forms a rectangle that is positioned so that it overlies the top edge of the envelope, so that it projects significantly beyond said top edge. This postal item, which has been unstacked properly, might be detected as being constituted by multiple overlapping postal items because the height of its outline is not constant, whereas it is in fact a single postal item. In the invention, if too large a number of wads of multiple postal items are detected in succession, rejection of said postal items is deactivated so long as some other number of consecutive single postal items is not detected. The deactivation is based on a count-down or "run" of results provided by multiple overlapping postal items being detected. With reference to FIG. 1, when multiple overlapping postal items PM are detected in the block 1, a counter n1 representing the number of consecutive wads of multiple postal items is incremented at 2, this counter being reset at 2' when a single postal item PS is detected. If the number of consecutive wads of multiple postal items n1 is greater than a predetermined number n1ref, rejection of multiple postal items is deactivated at 2 (RA:=0). At the following block 3, the postal item detected as being a wad of multiple postal items is rejected at 4 if the rejection of multiple postal items is active (RA=1), but if the rejection has been deactivated (RA=0), the postal item is considered as being a single postal item by being directed to block 4'. Thus, while processing a batch of mail which is difficult for the detector and in which all of the postal items are seen by the detector as being multiple postal items, whereas they are in fact single postal items, said postal items are not rejected wrongly. For example, the predetermined reference number n1ref may be about three or four.

In the invention, rejection remains deactivated until no multiple postal items are detected for another predetermined number of consecutive postal items. More particularly, when a single postal item PS is detected at 1, a counter n2 representative of the consecutive single postal items is incremented at 2', said counter being reset at 2 when a wad of multiple postal items PM are detected. If the number of consecutive single postal items n2 is greater than another predetermined number n2ref, rejection of multiple postal items is reactivated at 2' (RA:=1), so that the next wad of multiple postal items detected is rejected. Thus, activation and deactivation of rejection is managed independently by the management system of the sorting installation as a function of the results provided by the detector 1.

For such a batch of mail that is difficult for the detector, and that is made up of postal items such as the item shown in FIG. 4, the count-down of consecutive wads of multiple postal items deactivates rejection so as to avoid wrongly rejecting all of the postal items in said batch. When the following batch fed into the sorting installation is a batch of mail that does not lead to detection confusion, rejection is automatically reactivated without it being necessary for an operator to take any action.

The invention claimed is:

1. A method of detecting single postal items and multiple overlapping postal items in a postal sorting installation, said method comprising a step of providing a height measurement of the postal items (6) and detecting a variation of the measured height indicative of multiple overlapping postal items, said method being characterized in that said step of providing a height measurement comprises:

acquiring an image (5) of each postal item viewed from in front into an address automatic recognition process, applying to each image (5) an outline-extraction process (10) to extract an outline of each postal item; and analyzing said outline to provide said height measurement of said postal items.

2. A method according to claim 1, in which the outline extraction process comprises applying the Sobel operator or the Prewitt operator to the image.

3. A method according to claim 1, in which if the outline analysis leads to the detection of a variation of height of the outline, data representing the height of said outline at various points of the outline are provided to a classifier (CL) to detect a multiple overlapping postal item.

4. A method according to claim 3, in which the classifier is implemented in the form of a neural network.

5. A method according to claim 3, in which the classifier uses a set of statistical descriptors or primitives to characterize the outline.

6. A method according to claim 1, for a postal sorting installation including a device for rejecting multiple overlapping postal items, which method comprises counting the single postal items and the multiple overlapped postal items and deactivating rejection of multiple overlapping postal items when a first predetermined number (n1ref) of consecutive postal items are detected as being multiple overlapping postal items (6, 6'), said rejection being reactivated when a second predetermined number (n2ref) of consecutive postal items are detected as being single postal items.

* * * * *